United States Patent [19]

Dujardin et al.

[11] Patent Number: 5,109,079

[45] Date of Patent: Apr. 28, 1992

[54] MONOFUCTIONAL POLYACRYLATES, THEIR PRODUCTION AND THEIR USE FOR THE PRODUCTION OF POLYCARBONATES

[75] Inventors: Ralf Dujardin, Krefeld; Gerd Renner, Cologne; Karl-Erwin Piejko; Bruno Boemer, both of Bergisch Gladbach; Alfred Jung; Werner Nouvertné, both of Krefeld, all of Fed. Rep. of Germany

[73] Assignee: Bayer Aktiengesellschaft, Leverkusen Bayerwerk, Fed. Rep. of Germany

[21] Appl. No.: 624,013

[22] Filed: Dec. 7, 1990

[30] Foreign Application Priority Data

Dec. 16, 1989 [DE] Fed. Rep. of Germany ....... 3941563

[51] Int. Cl.$^5$ .............. C08G 64/18; C08G 64/14; C08G 64/08; C08F 2/38

[52] U.S. Cl. ................. 525/534; 525/147; 525/148; 525/539; 526/185; 526/194; 528/14; 528/16; 528/19; 528/21; 528/22; 528/26; 528/204; 528/205

[58] Field of Search .............. 525/147, 148, 534, 539; 526/185, 194; 528/14, 16, 19, 21, 22, 26, 204, 205

[56] References Cited

U.S. PATENT DOCUMENTS

| | | |
|---|---|---|
| 3,461,187 | 8/1969 | Cantrill ............... 260/873 |
| 3,462,515 | 8/1969 | Cantrill ............... 260/783 |
| 3,687,895 | 8/1972 | Vernaleken et al. ........ 260/47 |
| 3,991,009 | 11/1976 | Margotte et al. ........ 260/42.18 |
| 4,196,276 | 4/1980 | Schreckenberg et al. ......... 528/176 |
| 4,310,642 | 1/1982 | Margotte et al. ............ 525/468 |
| 4,319,003 | 3/1982 | Gardlund ................ 525/148 |
| 4,351,924 | 9/1982 | Andrews et al. ............ 525/330.6 |
| 4,414,372 | 11/1983 | Farnham et al. ............ 526/190 |
| 4,417,034 | 11/1983 | Webster ............... 526/190 |
| 4,543,403 | 9/1985 | Isayama et al. ............ 526/263 |
| 4,626,579 | 12/1986 | Reetz et al. ............ 526/194 |
| 4,798,873 | 1/1989 | Meurer et al. ............ 525/333.7 |

FOREIGN PATENT DOCUMENTS

| | | |
|---|---|---|
| 217178 | 4/1987 | European Pat. Off. . |
| 55-133405 | 10/1980 | Japan . |
| 58-101112 | 6/1983 | Japan . |
| 59-27908 | 2/1984 | Japan . |
| 6101015 | 3/1986 | Japan . |
| 6315821 | 3/1986 | Japan . |
| 63-15822 | 1/1988 | Japan . |

OTHER PUBLICATIONS

Chem. Abstracts vol. 81, No. 4, Jul. 29 1974, No. 13 988 A for JP 70 121 553 (Abstract only).

*Primary Examiner*—John C. Bleutge
*Assistant Examiner*—David Buttner
*Attorney, Agent, or Firm*—Joseph C. Gil; Richard E. L. Henderson

[57] ABSTRACT

The invention relates to polyacrylates corresponding to formula (I)

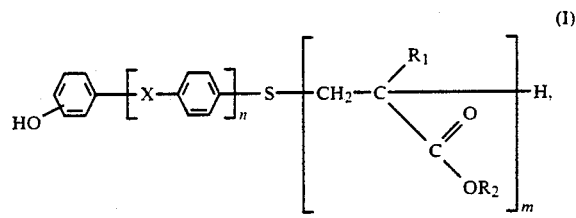

to their production in a quasi-ionic polymerization and to their use as monofunctional chain terminators, optionally in combination with typical other chain terminators, for the production of aromatic polycarbonates.

The invention also relates to the polycarbonates or polycarbonate mixtures obtained using the compounds corresponding to formula (I) and to their use as additives for other thermoplastic polycarbonates.

6 Claims, No Drawings

MONOFUCTIONAL POLYACRYLATES, THEIR PRODUCTION AND THEIR USE FOR THE PRODUCTION OF POLYCARBONATES

This invention relates to a process for the production of monofunctional polyacrylates which have number average molecular weights $\overline{M}_n$ in the range from 3,000 to 50,000 and preferably in the range from 5,000 to 20,000 and a polydispersity D of <1.5 and preferably <1.2 and which correspond to formula (I)

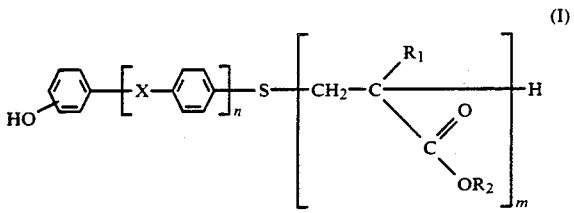

in which
X is a single bond, $C_{1-8}$ alkylene, $C_{2-12}$ alkylidene, cyclohexylidene, —S—, —CO— or —O—,
n is 0 or 1,
$R^1$ is H, $CH_3$ or CN,
$R^2$ is $C_{1-12}$ alkyl, $C_{5-6}$ cycloalkyl, $C_{7-15}$ aralkyl, $C_{7-15}$ alkaryl, $C_{6-18}$ aryl and $C_{2-12}$-ω-alkoxyalkyl; the alkyl groups may also be completely or partly fluorinated, and
m is an integer of from 30 to 500, preferably from 50 to 200 and more preferably from 75 to 175,
characterized in that mercaptosilanes corresponding to formula (II)

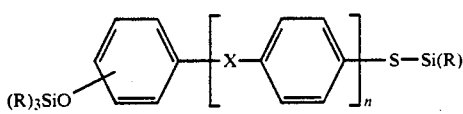

in which
X and n are as defined for formula (I) and
R is $C_{1-16}$ alkyl, $C_{5-6}$ cycloalkyl, $C_{7-15}$ aralkyl, $C_{7-15}$ alkaryl and $C_{6-18}$ aryl, preferably $CH_3$,
are reacted with compounds corresponding to formula (III)

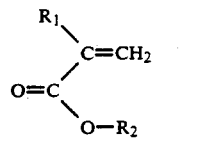

in which
$R_1$ and $R_2$ are as defined for formula (I),
in a quasi-ionic polymerization in the presence of catalysts at temperatures in the range from −50° to 100° C. with a molar ratio of (II) to (III) of from 1:5 to 1:1,000 and with a molar ratio of catalyst to compound (II) of from 1:500 to 1:0.1, the reaction being carried out in aprotic solvents, and on completion of polymerization the "living" polymers are deactivated with proton donors, such as for example $CH_3OH$ or $CH_3COOH$, the phenolic siloxy group is hydrolyzed to the free phenol, for example with methanolic hydrochloric acid, and the phenol-terminated polyacrylates are isolated in known manner by evaporation of the solvents.

The present invention also relates to the compounds corresponding to formula (I).

The number average molecular weights $\overline{M}_n$ are determined by gel chromatography after preliminary calibration. The weight average molecular weights $\overline{M}_w$ were also determined by gel permeation chromatography.

The polydispersity D is the ratio of the weight average molecular weight $\overline{M}_w$ to the number average molecular weight $\overline{M}_n$, i.e. $D = \overline{M}_w/\overline{M}_n$.

The compounds corresponding to formula (II) ar either commercially available, i.e. are known, or may be obtained by known methods by silylation of the corresponding mercaptans (cf. for example D. A. Evans, J. Am. Chem. Soc. 99, page 5009 (1977) and R. S. Glass, J. Organomet. Chem. 61 (83) 1973).

Suitable mercaptosilanes corresponding to formula (II) are, preferably, 3- or 4-(trimethylsiloxy)-phenyl mercaptotrimethyl silane.

The compounds corresponding to formula (III) are also known from the literature or may be obtained by methods known from the literature.

Preferred compounds (III) are the (meth)acrylates in which $R_1$ is H or $CH_3$ and $R_2$ is an optionally fluorinated $C_{2-8}$ alkyl radical.

Suitable catalysts are tris-(dimethylamino)-sulfonium fluorotrimethyl silicate (TASF), tetrabutyl ammonium fluoride (TBAF), tris-(dimethylamino)-sulfonium difluoride ($TASHF_2$), tetraalkyl ammonium difluorides, potassium difluoride, aluminium alkyl halides and zinc halides. Zinc iodide is a particularly suitable catalyst.

Processes for the ionic or quasi-ionic polymerization of polar monomers containing a double bond in the α-position to the polar group are known (cf. for example U.S. Pat. Nos. 4,351,924, 4,414,372 and 4,417,034). In these known processes, the ionic polymerization is initiated by initiators while the quasi-ionic polymerizations are initiated by initiators in the presence of nucleophilic or electrophilic catalysts.

A process for the quasi-anionic production of poly(meth)acrylates having a narrow molecular weight distribution using mercaptosilanes as initiators is described in DE-OS 3 504 168 (Le A 23 590).

On the basis of that publication, it was not logical to use the compounds corresponding to formula (II) because the phenolically formed oxygen-silicon bond is almost as stable as the sulfur silicon bond under reaction conditions. Accordingly, it was not foreseeable to the expert that compounds corresponding to formula (II), analogous to the mercaptosilanes described in DE-OS 3 504 168, would be suitable as initiators for the quasi-ionic polymerization and would lead to phenolic terminal silyl ether groups in the polyacrylates produced.

Suitable aprotic solvents for the quasi-ionic polymerization are, for example, acetonitrile, toluene or tetrahydrofuran.

The monofunctional polyacrylates according to the invention are eminently suitable for use as chain terminators in the production of aromatic polycarbonates, particularly by the interfacial process, optionally in conjunction with typical other chain terminators.

Accordingly, the present invention also relates to the use of the polyacrylates corresponding to formula (I) as monofunctional chain terminators, optionally in combination with typical other chain terminators, for the production of aromatic polycarbonates or polycarbonate mixtures.

Accordingly, the present invention also relates to a process for the production of aromatic polycarbonates or polycarbonate mixtures by the known interfacial polycondensation method from diphenols, phosgene and chain terminators in a mixture of aqueous-alkaline phase and organic phase in the presence of catalyst, characterized in that the chain terminators corresponding to formula (I) are used as the chain terminators in quantities of from 0.1 mol-% to 10 mol-%, based on mols diphenols, at most 99 mol-% of the molar quantities of chain terminator (I) to be used being replaceable by typical other chain terminators.

In other words, of the particular molar quantities of chain terminators to be used, which amount to between 0.1 mol-% and 10 mol-% and preferably to between 3 mol-% and 5 mol-%, based on mols diphenols, the chain terminators corresponding to formula (I) should make up from 100 mol-% to 1 mol-%, preferably 100 mol-% to 50 mol-% and, more preferably, 100 mol-% to 75 mol-% while the typical other chain terminators make up from 0 mol-% to 99 mol-%, preferably 0 mol-% to 50 mol-% and, more preferably, 0 mol-% to 25 mol-%.

In addition, the present invention relates to the polycarbonates or polycarbonate mixtures obtainable by the process according to the invention.

The molecular weights of the polycarbonates obtainable in accordance with the invention without the attached chain terminators, expressed as $\overline{M}_n$ (number average molecular weight, as determined by gel chromatography after preliminary calibration), should be in the range from 2,000 g/mol to 200,000 g/mol, preferably in the range from 5,000 g/mol to 150,000 g/mol and more preferably in the range from 7,500 g/mol to 100,000 g/mol.

The weight average molecular weights of the polycarbonates obtainable in accordance with the invention without the attached chain terminators ($\overline{M}_w$, again determined by gel permeation chromatography) should be in the range from 4,000 to 400,000, preferably in the range from 10,000 to 300,000 and more preferably in the range from 15,000 to 200,000.

The molecular weights of the polycarbonates or polycarbonate mixtures obtainable in accordance with the invention, including the attached chain terminators, understandably depend on the choice of the chain terminator itself which, even in the case of the typical other chain terminators, have an $\overline{M}_n$ of from 94 (for phenol) to about 300 to 400 (depending on the substituted phenols or carboxylic acid chlorides) and, in the case of the chain terminators of formula (I) according to the invention, have an $\overline{M}_n$ in the range from 3,000 to 50,000.

Accordingly, it is only possible to state a range for the average degree of polymerization of the polycarbonates or polycarbonate mixtures obtainable in accordance with the invention which depends upon the particular total molar quantity of chain terminator and not upon the particular type of chain terminator used.

The degrees of polymerization "p" of the polycarbonates or polycarbonate mixtures obtainable in accordance with the invention are from 10 to 1,000 and preferably from 30 to 80.

The polycarbonates or polycarbonate mixtures obtainable in accordance with the invention are either elastomers which can be processed as thermoplastics or tough thermoplastics, depending on the molecular weight of the aromatic middle part and the attached chain terminator.

Suitable catalysts for the synthesis of the polycarbonate (mixtures) according to the invention are, for example, tertiary amines, such as triethylamine or N-ethyl piperidine. The aqueous alkaline phase consists, for example, of aqueous sodium hydroxide or aqueous potassium hydroxide.

The organic phase consists, for example, of $CH_2Cl_2$ and/or chlorobenzene.

The polycarbonates or polycarbonate mixtures obtainable in accordance with the invention are isolated by breaking the two-phase emulsion obtainable by the process, separating the phases and, after washing with acid (for example phosphoric acid), passing the dried organic phase through known evaporation extruders and granulating the resulting strand. In the case of the elastomers processible as thermoplastics, working up may also be carried out by precipitation in apolar solvents, for example hexane, heptane.

Suitable diphenols for the production of the polycarbonates or polycarbonate mixtures according to the invention are, in particular, those corresponding to formula

$$HO-Z-OH \qquad (IV)$$

in which Z is an aromatic $C_{6-30}$ radical which may contain one or more aromatic nuclei, may be substituted and may contain aliphatic radicals, cycloaliphatic radicals, araliphatic radicals, —S—, —SO$_2$—, —CO— or —O— as bridge members.

Examples of diphenols corresponding to formula (IV) are hydroquinone, resorcinol, dihydroxydiphenyls, bis-(hydroxyphenyl)-alkanes, bis-hydroxyphenyl)-cycloalkanes, bis-(hydroxyphenyl)-sulfides, bis-(hydroxyphenyl)-ethers, bis-(hydroxyphenyl)-ketones, bis-(hydroxyphenyl)-sulfones, bis-(hydroxyphenyl)-sulfoxides, α, α'-bis-(hydroxyphenyl)-diisopropyl benzenes and ring-alkylated and ring-halogenated compounds thereof.

These and other suitable diphenols (IV) are described, for example, in U.S. Pat. Nos. 3,028,365, 2,999,835, 3,148,172, 3,275,601, 2,991,273, 3,271,367, 3,062,781, 2,970,131 and 2,999,846; in DE-OSS 1 570 703, 2 063 050, 2 063 052 and 2 211 956; in German patent application P 38 32 396.6 (Le A 26 344), in FR-PS 1 561 518 and in the monograph by H. Schnell entitled "Chemistry and Physics of Polycarbonates", Interscience Publishers, N.Y., 1964.

Preferred diphenols (IV) are, for example, 4,4'-dihydroxydiphenyl, 2,2-bis-(4-hydroxyphenyl)-propane, 2,4-bis-(4-hydroxyphenyl)-2-methyl butane, 1,1-bis-(4-hydroxyphenyl)-cyclohexane, 1,1-bis-(4-hydroxyphenyl)-3,3,5-trimethyl cyclohexane, α, α'-bis-(4-hydroxyphenyl)-p-diisopropyl benzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfone, 2,4-bis-(3,5-dimethyl-4-hydroxyphenyl)-2-methyl butane, 1,1-bis-(3,5-dimethyl-4-hydroxyphenyl)-cyclohexane, α,α'-bis-(3,5-dimethyl-4-hydroxyphenyl)-p-diisopropyl benzene, 2,2-bis-(3,5-dichloro-4-hydroxyphenyl-propane and 2,2-bis-(3,5-dibromo-4-hydroxyphenyl)-propane.

Particularly preferred diphenols corresponding to formula (IV) are, for example, 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane, 1,1-bis-(4-hydroxyphenyl)-cyclohexane and 1,1-bis-(4-hydroxyphenyl)-3,3,5-trimethyl cyclohexane.

The diphenols may be used both individually and also in admixture.

Typical other chain terminators, i.e. known chain terminators for the synthesis of polycarbonates, are in particular low molecular weight chain terminators, i.e. phenolic compounds other than those corresponding to formula (I), such as for example phenol itself, or alkyl phenols, such as for example tert.-butylphenol or other $C_{1-7}$-alkyl-substituted phenols and, more particularly, those corresponding to formula (V)

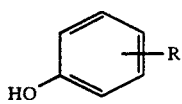
(V)

in which R is a branched $C_8$ and/or $C_9$ alkyl radical. In the alkyl radical R, the percentage content of $CH_3$ protons is between 47 and 89% and the percentage content of CH and $CH_2$ protons between 53 and 11%; R is preferably in the o-and/or p-position to the OH group. More preferably, the upper limit to the ortho component is 20%.

Other suitable typical chain terminators are halophenols, such as p-chlorophenol and 2,4,6-tribromophenol. These chain terminators are known from the literature.

Accordingly, the polycarbonates or polycarbonate mixtures obtainable in accordance with the invention, in the production of which the preferred quantity of chain terminators (I) of 100% to 50% and, more particularly, 100% to 75%, based on the total mol-% of chain terminators used, is used, preferably correspond to formula (VI)

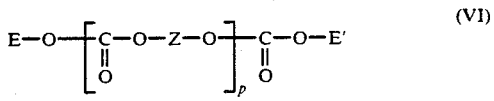
(VI)

in which
—Z— is as defined for formula (IV),
p is an integer of 10 to 1,000 and preferably 30 to 80,
E—O— represents a unit corresponding to formula (Ia)

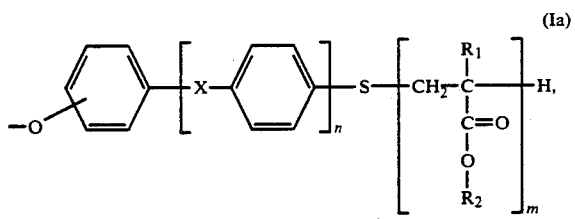
(Ia)

in which X, m, n, $R_1$ and $R_2$ are as defined for formula (I) and in which E'—O is either E—O— or the residue of the typical other chain terminator mentioned above, i.e. in particular low molecular weight phenoxy groups other than (Ia); more particularly, at least half E'—O corresponds to the residue E—O; namely when (I) is used in quantities of 100 to 75%, based on the total mol-% of chain terminator used.

PRIOR ART

Polymers with side groups on the backbone and polycarbonate chains grafted thereon are described in DE-OS 1 595 777.

In our opposition to the corresponding DE-AS 1 595 777, we stated that, although the graft bases may also have an average functionality of less than 1, i.e. may be monofunctional, the patent department of the German patent office, in their decision of 20.2.83, clearly ruled out the presence of linear copolymers according to DE-AS 1 595 777.

The polymers according to U.S. Pat. No. 3,687,895, DE-AS 1 770 144 or DE-OS 1 770 144 (Le A 11 295) relate to polycarbonate chains grafted onto phenolic OH, at least five OH groups having to be present per molecule.

Corresponding graft polycarbonates containing 3 to 10 side chains are known from DE-OS 2 357 192 (Le A 15 222).

The radical polymerization of vinyl monomers in the presence of thermoplastic polycarbonates is also known (cf. for example U.S. Pat. No. 3,462,515). If grafting reactions take place, it is not possible to define any specific point in the polycarbonate chain. In addition, the molecular weights of the graft-polymerized vinyl polymers are generally higher than those of anionically polymerized vinyl polymers.

The reaction of allyl-terminated polycarbonates with vinyl compounds is described in Chem. Abstracts, Vol. 81, No. 4, 29th July, 1974, Ref. No. 13 998a relating to Japanese patent application No. 70 121 553. The products obtained are transparent and soluble.

According to DE-OS 2 702 626 (Le A 17 356), COOH-containing polymers containing 1 to 5 COOH groups are included in the polycarbonate synthesis.

EP-PS 9 747 relates to branched, high molecular weight thermoplastic compounds which are made up of polycarbonate segments and polyether segments, being produced by polymerization of polycarbonates containing at least one unsaturated terminal group per molecule in the presence of a radically polymerizable monomer.

Polyolefin carboxylic acids and their use for the production of polyolefin-polycarbonate block copolymers are known from DE-OS 3 618 378 (Le A 24 330).

Oligocarbonates containing unsaturated terminal groups are known from JA 63/15 821 (only available as an abstract).

Polycarbonate block copolymers are known from JA 63/15 822 (only available as an abstract), according to which vinyl and polycarbonate resins are produced in the presence of isopropenyl phenols and vinyl compounds are polymerized onto polycarbonate resins.

Branched segment polymers are known from DE-OS 2 612 230 (Le A 17 926).

Copolymers based on polycarbonates containing special terminal groups and polymers are known from JA 58/101 112 (only available as an abstract).

Readily processable polycarbonate resins are known from JA 55/133 405 (only available as an abstract), being obtained by polymerization of unsaturated monomers in aqueous dispersion in the presence of polycarbonate granulate containing flow aids.

Polycarbonate block copolymers obtained from polycarbonates and polymerizable monomers, the polycarbonates containing radical-forming groups, are known from JA 59/27 908 (only available as an abstract).

According to Japanese patent application 61/051 015 (only available as an abstract), polycarbonate block copolymers are obtained by irradiation of polycarbonates containing benzoin structures in the presence of unsaturated monomers.

Block copolymers having the structure polymethyl methacrylate - polycarbonate - polymethyl methacrylate are already known from U.S. Pat. No. 4,319,003, the polymethacrylate blocks having an $\overline{M}_n$ (number average) of 500 to 35,000, the polycarbonate block having an $\overline{M}_n$ (number average) of 500 to 30,000 and the block copolymers having an $\overline{M}_n$ (number average) of 15,000 to 100,000.

However, these block copolymers are produced in a different way, namely: the monofunctional polymethyl methacrylates are produced by radical polymerization, converted into monochloroformates and then reacted with polycarbonate diphenols in a ratio of 2:1.

Disadvantages include a broad molecular weight distribution of the polycarbonate diphenols produced without chain terminators, a broad molecular weight distribution of the radically produced polymethyl methacrylates and the presence of non-incorporated polymethyl methacrylate segments in the block copolymer due to the generally known secondary reactions which accompany radical polymerizations or to the low reactivity of aliphatic OH groups during the conversion into the monochloroformates (cf. Schnell, Chemistry and Physics of Polycarbonates, Interscience Publishers, 1964, page 57, paragraphs 2 and 3).

The polycarbonates or polycarbonate mixtures obtainable by the process according to the invention are either resistant to gasoline themselves where typical other chain terminators are predominantly used or, where chain terminators (I) were predominantly used, have the effect—when used as additives for other thermoplastic aromatic polycarbonates—of improving their resistance to gasoline.

In the latter case, therefore, the gasoline-resistant polycarbonate molding compounds can be additionally varied by blending with other, separately produced polycarbonates and also through the choice of a different molecular weight or, better yet, a different degree of polymerization of the separately produced polycarbonate.

Accordingly, the present invention also relates to the use of the polycarbonates or polycarbonate mixtures corresponding to formula (VI) obtainable in accordance with the invention [component B)] in quantities of 0.5% by weight to 30% by weight, preferably in quantities of 1% by weight to 12% by weight and more preferably in quantities of 2% by weight to 9% by weight, based on the total weight of component B) and other thermoplastic, aromatic polycarbonate [component A)], for improving the resistance of other thermoplastic, aromatic polycarbonates [component A)] to gasoline.

Accordingly, the present invention also relates to polycarbonate molding compounds containing 0.5% by weight to 30% by weight, preferably 1% by weight to 12% by weight and, more preferably, 2% by weight to 9% by weight, based on the total weight of polycarbonate molding compound, of the polycarbonates or polycarbonate mixtures of formula (VI) obtainable in accordance with the invention [component B)] and 99.5% by weight to 70% by weight, preferably 99% by weight to 88% by weight and, more preferably, 98% by weight to 91% by weight of other thermoplastic polycarbonates [component A)], the sum of components A) + B) being 100% by weight.

Improving resistance to gasoline in this way is neither discussed nor suggested in U.S. Pat. No. 4,319,003. Instead, the resistance of thermoplastic polycarbonates to gasoline can be improved in various ways (cf. for example DE-OS 31 20 594, EP-PS 0 077 415, DE-OS 33 02 124, EP-OS 0 131 196, DE-OS 33 47 071, DE-OS 36 28 258, DE-OS 37 12 116 and the prior art cited therein and, in addition, EP-PS 0 119 533, EP-OS 0 173 358 and EP-OS 0 186 825).

However, the gasoline-resistant polycarbonate molding compounds according to the invention are neither described nor suggested in this prior art.

Other thermoplastic aromatic polycarbonates of component A) according to the present invention are polycarbonates which contain no terminal groups corresponding to formula (Ia).

The other thermoplastic aromatic polycarbonates of component A), of which the gasoline resistance is to be improved in accordance with the invention, are those based on diphenols corresponding to formula (VII)

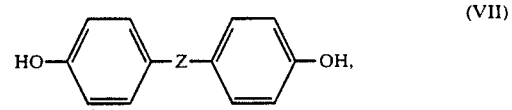

in which

Z is a single bond, a $C_{1-8}$ alkylene group, a $C_{2-12}$ alkylidene group, a cyclohexylidene group, a 3,3,5-trimethyl cyclohexylidene group according to German patent application P 38 32 396.6 (Le A 26 344), a benzylidene group, a methyl benzylidene group, a bis-(phenyl)-methylene group, —S—, —SO$_2$—, —CO— or —O—, with weight average molecular weights $\overline{M}_w$ (as determined in known manner via the relative solution viscosity) in the range from 15,000 to 120,000, preferably in the range from 20,000 to 80,000 and more preferably in the range from 25,000 to 45,000.

Suitable diphenols (VII) are listed above under the diphenols (IV); the same also applies to the preferred and particularly preferred diphenols (VII).

However, other preferred diphenols corresponding to formula (VII) are those in which —Z— contains a polymeric siloxy group and which correspond to formula (VIIa)

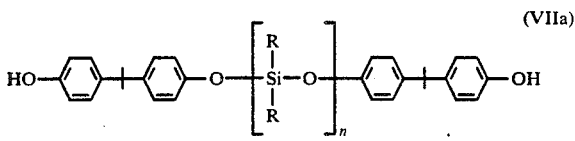

in which

R is $C_{1-4}$ alkyl, preferably $CH_3$, and n has a value of 20 to 100 and preferably 40 to 80.

Suitable diphenols corresponding to formula (VIIa) are, for example, those corresponding to formula (VIIb)

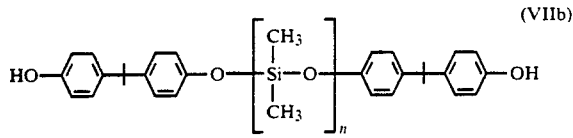

(VIIb)

in which n has a value of 40, 60 or 80.

The polycarbonates of component A) are both homopolycarbonates and also copolycarbonates, the diphenols (VIIa) or (VIIb) being incorporated in the polycarbonates by condensation in quantities of at most 20% by weight, based on the molar sum of all the diphenols (VII)+(VIIa) or (VIIb) to be used.

The polycarbonates of component A) may be linear or even branched.

If desired, small quantities, preferably quantities of 0.05 to 2.0 mol-% (based on mols diphenols used), of trifunctional or more than trifunctional compounds, more particularly those containing three or more than three phenolic hydroxyl groups, are used as branching agents to obtain branched polycarbonates. Some of the compounds containing three or more than three phenolic hydroxyl groups which may be used as branching agents are phloroglucinol, 4,6-dimethyl-2,4,6-tri-(4-hydroxyphenyl)-hept-2-ene, 4,6-dimethyl-2,4,6-tri-(4-hydroxyphenyl)-heptane 1,3,5-tri-(4-hydroxyphenyl)-benzene,1,1,1-tri-(4-hydroxyphenyl)-ethane, tri-(4-hydroxyphenyl)-phenyl methane, 2,2-bis-(4,4-bis-(4-hydroxyphenyl)-cyclohexyl)-propane, 2,4-bis-(4-hydroxyphenylisopropyl)-phenol, 2,6-bis-(2-hydroxy-5'-methylbenzyl)-4-methylphenol, 2-(4-hydroxyphenyl)-2-(2,4-dihydroxyphenyl)-propane, hexa-(4-(4-hydroxyphenylisopropyl)-phenyl)-orthoterephthalic acid ester, tetra-(4-hydroxyphenyl)-methane, tetra-(4-(4-hydroxyphenylisopropyl)-phenoxy)-methane and 1,4-bis-(4',4''-dihydroxytriphenyl)-methyl)-benzene.

Some of the other trifunctional compounds are 2,4-dihydroxybenzoic acid, trimesic acid, cyanuric chloride and 3,3-bis-(3-methyl-4-hydroxyphenyl)-2-oxo-2,3-dihydroindole.

Suitable chain terminators for regulating the molecular weights of the polycarbonates of component A) are the chain terminators typically used in the synthesis of polycarbonates, more particularly low molecular weight chain terminators, i.e. other phenolic compounds than those corresponding to formula (I), of the type already described for the production of the polycarbonates according to the invention of component B).

The polycarbonates of component A) are either known from the literature or are the subject of German patent applications P 38 32 396.6 (Le A 26 344) and P 38 42 931.4 (Le A 26 318) or may be produced by known methods.

The polycarbonates of component A) may be used both individually and in combination with one another.

To produce the polycarbonate molding compounds according to the invention from the polycarbonates or polycarbonate mixtures of formula (VI) according to the invention [component B)] and the other polycarbonates of component A), the components may be mixed in the particular ratio desired above the softening temperature of the other thermoplastic aromatic polycarbonates used as component A).

This may be done in a single step, for example by compounding during extrusion in standard screw extruders, for example at temperatures in the range from 280° to 350° C. Known machines are suitable for compounding. Twin screw extruders are preferably used.

The polycarbonate molding compounds according to the invention may also be produced by mixing solutions of the polycarbonates of component B) with solutions of the polycarbonates of component A), followed by evaporation of the solvents, for example in an extruder, and subsequent granulation or other isolation.

Accordingly, the present invention also relates to a process for the production of the polycarbonate molding compounds according to the invention containing as component A)

70% by weight to 99.5% by weight, preferably 88% by weight to 99% by weight and more preferably 91% by weight to 98% by weight of the thermoplastic aromatic polycarbonates in question and as component B)

30% by weight to 0.5% by weight, preferably 12% by weight to 1% by weight and, more preferably, 9% by weight to 2% by weight of the polycarbonates or polycarbonate mixtures of formula (VI) obtainable in accordance with the invention, the total weight of A)+B) being 100% by weight, characterized in that either components A) and B) are mixed above the softening temperature of component A) and the resulting mixture is subsequently isolated in known manner or solutions of component A) are mixed with solutions of component B) and the resulting mixture is subsequently isolated in known manner by evaporation of the solvents.

A suitable solvent for the polycarbonate component A) is, for example, $CH_2Cl_2$; a suitable solvent for component B) is, for example, methylene chloride or chlorobenzene.

The stabilizer systems and/or mold release agents typical of polycarbonate or poly(meth)acrylates may of course be used as required in polymer mixtures of the type in question, being incorporated in known manner by compounding as described above.

To determine resistance to gasoline, test specimens measuring 80 mm×10 mm×4 mm were made up and fixed to flexible templates having different radii of curvature in such a way that outer fiber strains $\epsilon_R$ of 0.3% and 1.0% were obtained. The templates together with the test specimens were stored in a heating cabinet (with air circulation; DIN 50 011, 2, 3) for 15 minutes at 70° C.

The templates together with the test specimens were then removed from the heating cabinet and a cotton wool plug impregnated with a test fuel was applied immediately afterwards. The test fuel used was a white spirit according to DIN 51 604 which consists of 50% by volume toluene, 30% by volume isooctane, 15% by volume diisobutylene and 5% by volume ethanol. After a contact time of 15 minutes, the cotton wool plug was removed and the test specimen was left for another 15 minutes to air.

The test specimens were then evaluated with the naked eye on the basis of the following scale:

| Stage | Feature |
| --- | --- |
| 1 | No visible change |
| 2 | Surface matted |
| 3 | Fine cracks |
| 4 | Large cracks, fracture |

The improved impact strength was also determined on test specimens measuring 80 mm×10 mm×4 mm. Izod notched impact strength ($a_k$) was determined in accordance with ISO 180/1A. The results of the performance tests are shown in the following Table. A p-tert.-butylphenoxyterminated bisphenol A polycarbonate having an $\eta_{rel}$ value of 1.290 and a p value of 55.5 was tested for comparison (Example 6).

EXAMPLES

EXAMPLE 1 a) Preparation of a compound of formula (I) in which n=O, $R_1$=H and $R_2$=$C_4H_9$ 3.5 l anhydrous toluene were introduced under nitrogen into a thoroughly heated 12 liter autoclave equipped with a paddle stirrer. 1.5 kg butyl acrylate distilled over calcium hydroxide and 19.5 g dried zinc iodide are then added. The autoclave is purged three times with nitrogen and cooled to 0° C. 90 g bis-trimethylsilyl monothiohydroquinone are then added and the reaction mixture is stirred for 20 hours at 0° C. The reaction is then stopped by addition of 150 ml methanol.

The solution is introduced into a column filled with $Al_2O_3$ and, after the addition of 50 ml concentrated hydrochloric acid and 150 ml methanol, the silyl groups are eliminated for 3 hours at 80° C.

The yield after evaporation in a rotary evaporator was approximately 1,300 g.

The average molecular weight $\overline{M}_n$, as determined by gel permeation chromatography, was 14,100 (m=110) g/mol and the polydispersity D was 1.09.

b) Polycarbonate containing terminal groups corresponding to formula (Ia)

15 g (0.15 mol) phosgene are introduced over a period of 15 minutes with stirring at 20° to 25° C. into a mixture of 22.8 g(0.10 mol) 2,2-bis-(4-hydroxyphenyl)-propane (BPA), 20 g sodium hydroxide (0.50 mol), 400 ml water and 42.3 g (=3 mol-%, based on BPA) of the polybutyl acrylate described in a) dissolved in 600 ml methylene chloride. 0.14 ml (=1 mol-%, based on BPA) N-ethyl piperidine is then added, followed by stirring for 1 hour. The organic phase is separated off, washed until free from electrolyte and dried at 80° C. after removal of the methylene chloride by distillation. 65 g of product having a relative solution viscosity $\eta_{rel}$ of 1.248 were obtained.

The aromatic polycarbonate block has a molecular $\overline{M}_n$ of 16,600 g/mol (as determined by gel permeation chromatography), corresponding to a degree of polycondensation p of 65.3. The total molecular weight $\overline{M}_n$ of the block copolymer, including the terminal groups, is 44,800 g/mol.

EXAMPLE 2

Polycarbonate containing terminal groups corresponding to formula (Ia)

15 g (0.15 mol) phosgene are introduced with stirring over a period of 1 hour at 20° to 25° C. into a mixture of 22.8 g (0.10 mol) 2,2-bis-(4-hydroxyphenyl)-propane (BPA), 20 g sodium hydroxide (0.5 mol), 400 ml water and 14.1 g (=1 mol-%, based on BPA) of the polybutyl acrylate described in a) dissolved in 600 ml methylene chloride. 0.14 ml (=1 mol-%, based on BPA) N-ethyl piperidine is then added, followed by stirring for 1 hour. The organic phase is separated off, washed free from electrolyte and the block copolymer is dried at 80° C. after removal of the methylene chloride by distillation. 37 g of product having a relative solution viscosity $\eta_{rel}$ of 1.464 were obtained.

The aromatic polycarbonate block has a molecular weight $\overline{M}_n$ of 22,600 g/mol, corresponding to a degree of polycondensation p of 89. The total molecular weight of the block copolymer, including the terminal groups, is 50,800 g/mol.

EXAMPLE 3

Polycarbonate containing terminal groups corresponding to formula (Ia) and a terminal 4-tert.-butylphenoxy group 15 g (0.15 mol) phosgene are introduced with stirring over a period of 1 hour at 20° to 25° C. into a mixture of 22.8 g (0.10 mol) 2,2-bis-(4-hydroxyphenyl)-propane (BPA), 20 g sodium hydroxide (0.5 mol); 400 ml water, 0.225 g (=1.5 mol-%, based on BPA) 4-tert.-butylphenol and 21.65 g (=1.5 mol-%, based on BPA) of the polybutyl acrylate described in a) dissolved in 600 ml methylene chloride. 0.14 ml (=1 mol-%, based on BPA) N-ethyl piperidine is then added, followed by stirring for 1 hour. The organic phase is separated off, washed free from electrolyte and the block copolymer is dried at 80° C. after removal of the methylene chloride by distillation. 42 g product having a relative solution viscosity $\eta_{rel}$ of 1.258 were obtained.

The aromatic polycarbonate block has a molecular weight $\overline{M}_n$ of 14,200 g/mol, corresponding to a degree of polycondensation p of 56. The total molecular weight of the block copolymer, including the terminal groups, is 28,300 g/mol.

EXAMPLE 4

Mixing by melt compounding 93.4 Parts of a polycarbonate (PC) of bisphenol A having a relative solution viscosity $\eta_{rel}$ of 1.290 (as measured in methylene chloride, 5 g/l, at 25° C.) and 6.6 parts of the block copolymer (corresponding to 4 parts butyl acrylate block) of Example 1b) were mixed by compounding at 270° to 290° C. in a ZSK 32.

EXAMPLE 5

In situ blend production 2.7 kg (27 mol) phosgene are introduced with stirring over a period of 1 hour at 20° to 25° C. into a mixture of 4.56 kg (20 mol) 2,2-bis-(4-hydroxyphenyl)-propane (BPA), 99.8 g (=3.4 mol-%, based on BPA) p-tert.-butylphenol, 8 kg sodium hydroxide (w=45%), 40 l water, 12 kg chlorobenzene and 250 g (=4% by weight, based on the total weight of the polycarbonate produced) of the polybutyl acrylate described in Example 1a) dissolved in 37 kg methylene chloride. 28 ml (=1 mol-%, based on BPA) N-ethyl piperidine are then added, followed by stirring for 1 hour. The organic phase is separated off, washed until free from electrolyte and extruded at 280° C. after removal of the methylene chloride by distillation. 3.7 kg product having a relative solution viscosity $\eta_{rel}$ of 1.292 were obtained. The polycarbonate-co-butyl acrylate has a molecular weight $\overline{M}_n$ of 28,000 g/mol, corresponding to a degree of polycondensation of the aromatic polycarbonate block of 54.7. The percentage content of conventional p-tert.-butyl phenyl-terminated bisphenol A polycarbonate of component A) is 90.5% by weight (97.4 mol-%).

TABLE

| Properties $a_k$ (kJ/m$^2$) | Examples | | |
|---|---|---|---|
| | 4 | 5 | 6 |
| +23° C. | 719 | 749 | 802 |
| +0° C. | 658 | 743 | 348 |
| −10° C. | 387 | 388 | 226 |
| −20° C. | 239 | 247 | — |
| −30° C. | — | — | — |
| −40° C. | — | — | — |
| Gasoline resistance 1st cycle | | | |
| E = 0.3% | 2 | 2 | 4 |
| E = 1.0% | 2 | 2 | — |
| 2nd cycle | | | |
| E = 0.3% | 2 | 2 | — |
| E = 1.0% | 2 | 2 | — |

What is claimed is:

1. A process for the production of a monofunctional polyacrylate corresponding to

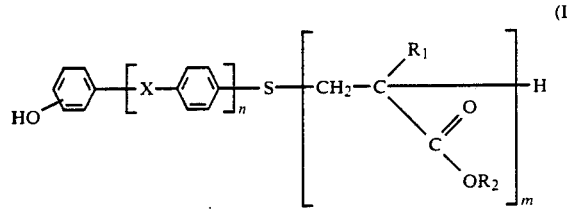

in which

X is a single bond, $C_{1-8}$ alkylene, $C_{2-12}$ alkylidene, cyclohexylidene, —S—, —CO— or —O—, n is 0 or 1, R1 is H, CH$_3$ or CN, R2 is $C_{1-12}$ alkyl, $C_{5-6}$ cycloalkyl, $C_{7-12}$ aralkyl, $C_{7-15}$ alkaryl, $C_{6-18}$ aryl or $C_{2-12}$-w-alkoxyalkyl;

m is an integer of from 30 to 500, comprising (i) reacting a mercaptosilane corresponding to

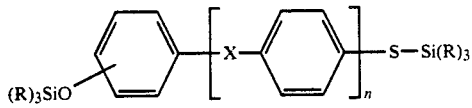

in which

X and n are as defined for formula (I) and

R is $C_{1-16}$ alkyl, $C_{5-6}$ cycloalkyl, $C_{7-15}$ aralkyl, $C_{7-15}$ alkaryl or $C_{6-18}$ aryl, with a compound corresponding to

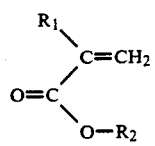

in which

R$_1$ and R$_2$ are as defined for formula (I), in a quasi-ionic polymerization in an aprotic solvent and in the presence of a catalyst selected from the group consisting of tris-(dimethylamino)-sulfonium fluorotrimethyl silicate, tetrabutyl ammonium fluoride, tris-(dimethylamino)-sulfonium difluoride, tetraalkyl ammonium difluoride, potassium difluoride, aluminum alkyl halide and zinc halide at a temperature of about −50° to 100° C. with a molar ratio of said (II) to said (III) of from 1:5 to 1:1000 and with a molar ratio of catalyst to said (II) of from 1:500 to 1:0.1, to obtain a living polymer and (ii) deactivating said living polymer with a proton donor, the phenolic siloxy group is hydrolyzed to the free phenol, and (iii) isolating said polyacrylate by evaporation of said solvent, said polyacrylates having a number average molecular weight of about 3,000 to 50,000 and a polydispersity D of <1.5.

2. A compound corresponding to

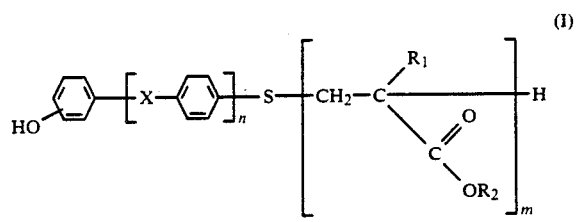

in which

X, n, m, R$_1$ and R$_2$ are as defined in claim 1.

3. In the process for the production of an aromatic polycarbonate by the interfacial polycondensation method from a diphenol, phosgene and a chain terminator in a mixture of aqueous-alkaline phase and organic phase in the presence of a catalyst, the improvement comprising using the monofunctional polyacrylate of claim 2 as a chain terminator in quantities of from 0.1 mol-% to 10 mol-%, based on the molar amount of said diphenol, at most 99 mol-% of the molar amount of said chain terminator being replaced by other chain terminators.

4. The polycarbonate obtained by the process of claim 3.

5. A polycarbonate corresponding to

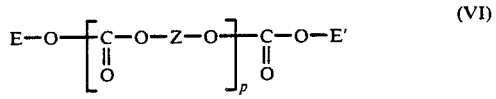

in which

—Z— is an aromatic $C_{6-30}$ radical p is an integer of 10 to 1000,

E—O— denotes

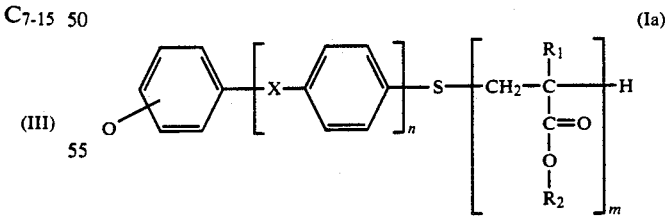

where

X, n, m, R$_1$ and R$_2$ are as defined in claim 1, and

E'—O— is either E—O— or the residue of an other chain terminator.

6. A thermoplastic molding composition comprising a polycarbonate resin which contain no terminal groups corresponding to (Ia) of claim 5 and about 0.5 to 30 percent of the polycarbonate of claim 5, said percent being relative to the weight of said composition.

* * * * *